United States Patent [19]
Christopherson

[11] 3,912,859
[45] Oct. 14, 1975

[54] ELECTRONIC TRACKING DEVICE

[75] Inventor: Rodger L. Christopherson, Garden Grove, Calif.

[73] Assignee: Philco-Ford Corporation (Now Aeronutronic Ford Corporation), Blue Bell, Pa.

[22] Filed: June 8, 1962

[21] Appl. No.: 201,041

[52] U.S. Cl. ...... 178/6.8; 178/DIG. 21; 250/203 CT
[51] Int. Cl.² .......................................... H04N 7/00
[58] Field of Search ............... 250/83.31 R, 203 CT; 178/6.8, DIG. 21; 343/6, 7

[56] References Cited
UNITED STATES PATENTS

| | | | |
|---|---|---|---|
| 2,981,842 | 4/1961 | Kaufold et al. | 250/348 |
| 2,981,843 | 4/1961 | Hansen | 250/203 |
| 3,036,152 | 5/1962 | Courtney-Pratt | 178/6.8 |

Primary Examiner—Maynard R. Wilbur
Assistant Examiner—H. A. Birmiel
Attorney, Agent, or Firm—Robert D. Sanborn

EXEMPLARY CLAIM

1. In an electronic tracking device sensitive to radiation of scanned targets the combination of:
   focusing means having an optical axis for forming an optical image of a target,
   means for converting said optical image to an electronic image at a focal point,
   means for nutating said electronic image in a focal plane about said optical axis,
   detector means comprising a plurality of separated detector surfaces,
   means responsive to said nutated electronic image for forming a target image on said detector surfaces,
   and means for measuring the proportional duration of said target image on each of said surfaces to provide signals proportional to the deviation of said target from said optical axis.

7 Claims, 6 Drawing Figures

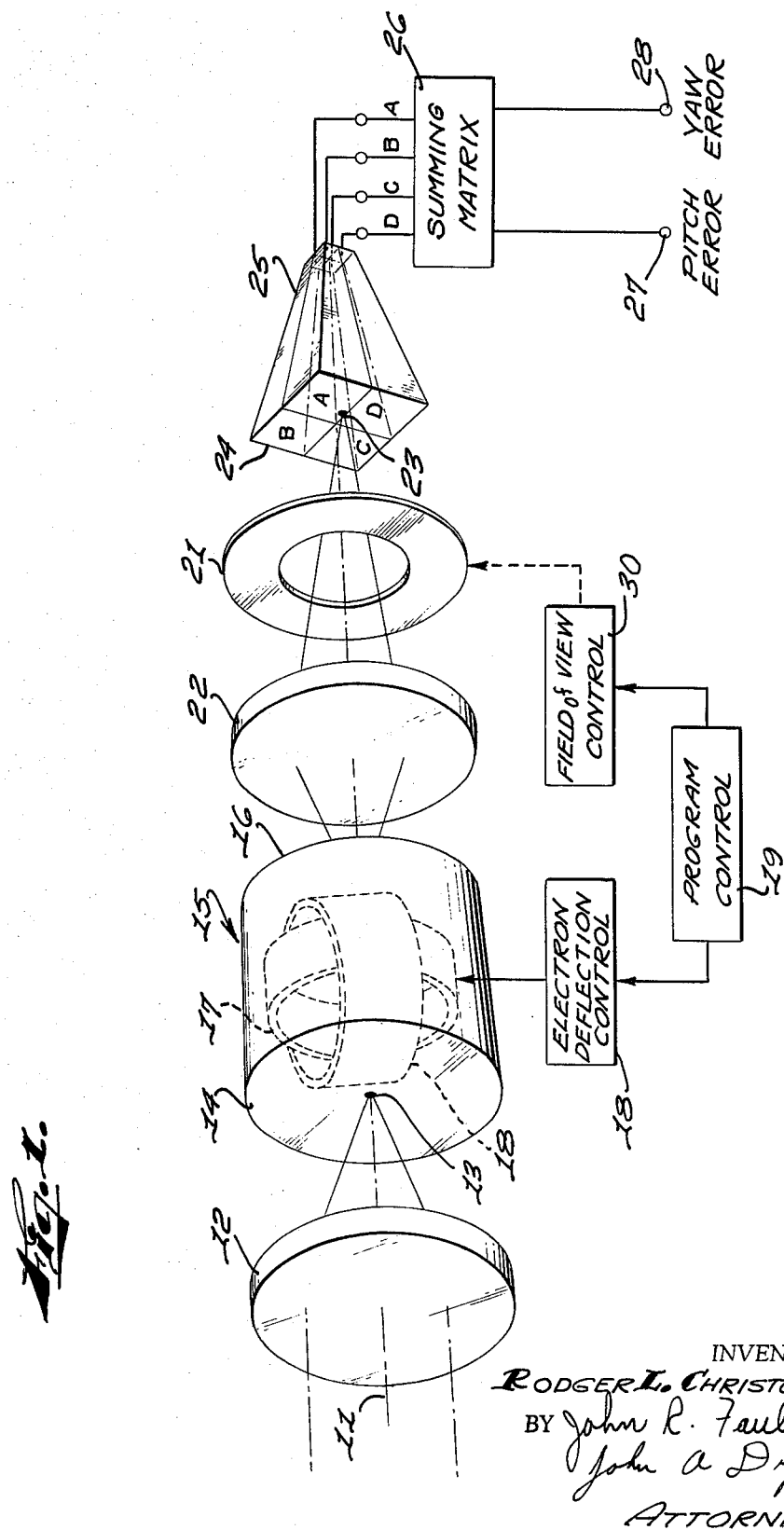

U.S. Patent  Oct. 14, 1975  Sheet 2 of 3  3,912,859
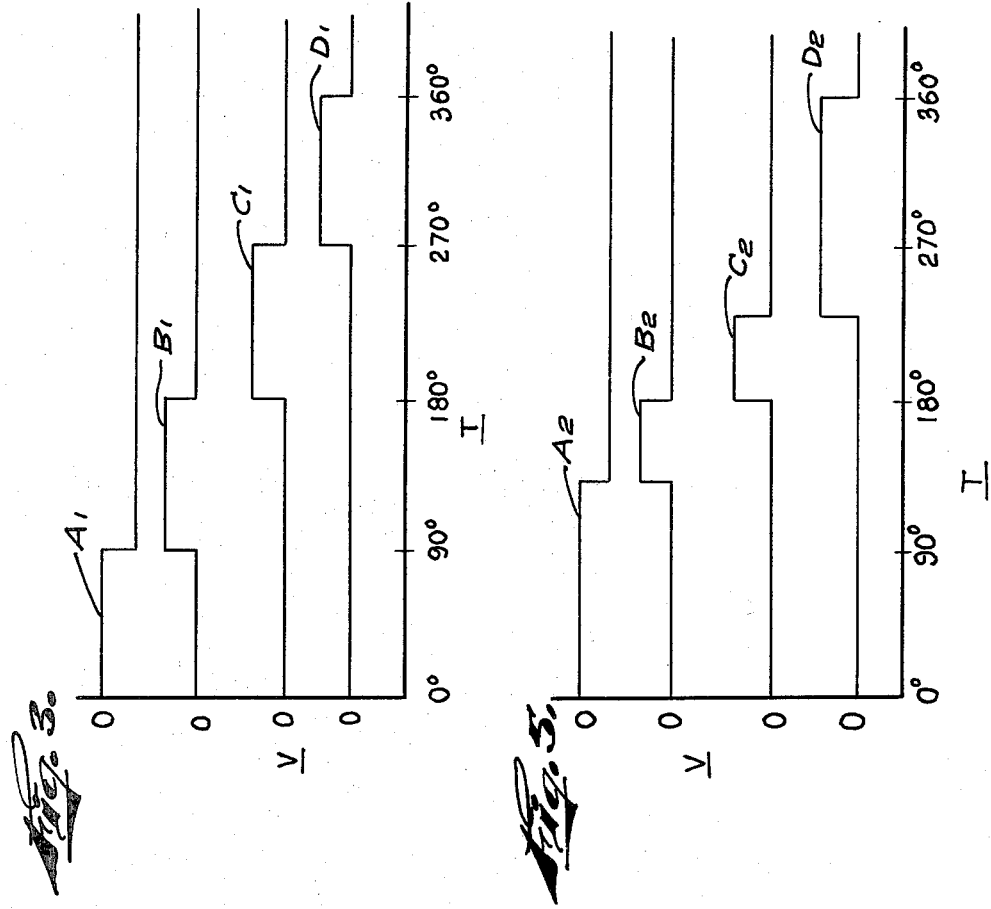
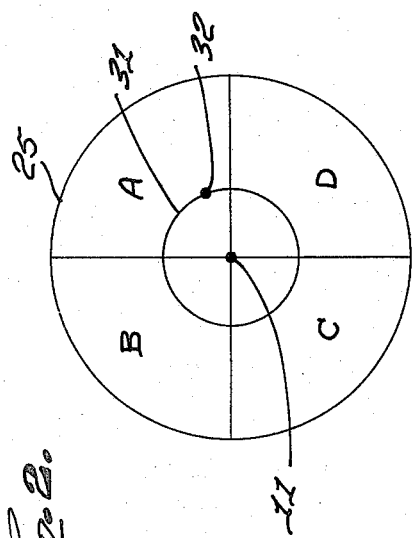
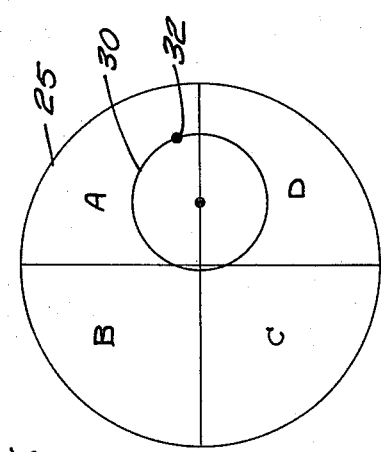
INVENTOR.
RODGER L. CHRISTOPHERSON
BY John L. Faulkner
John A. Duffy
ATTORNEYS

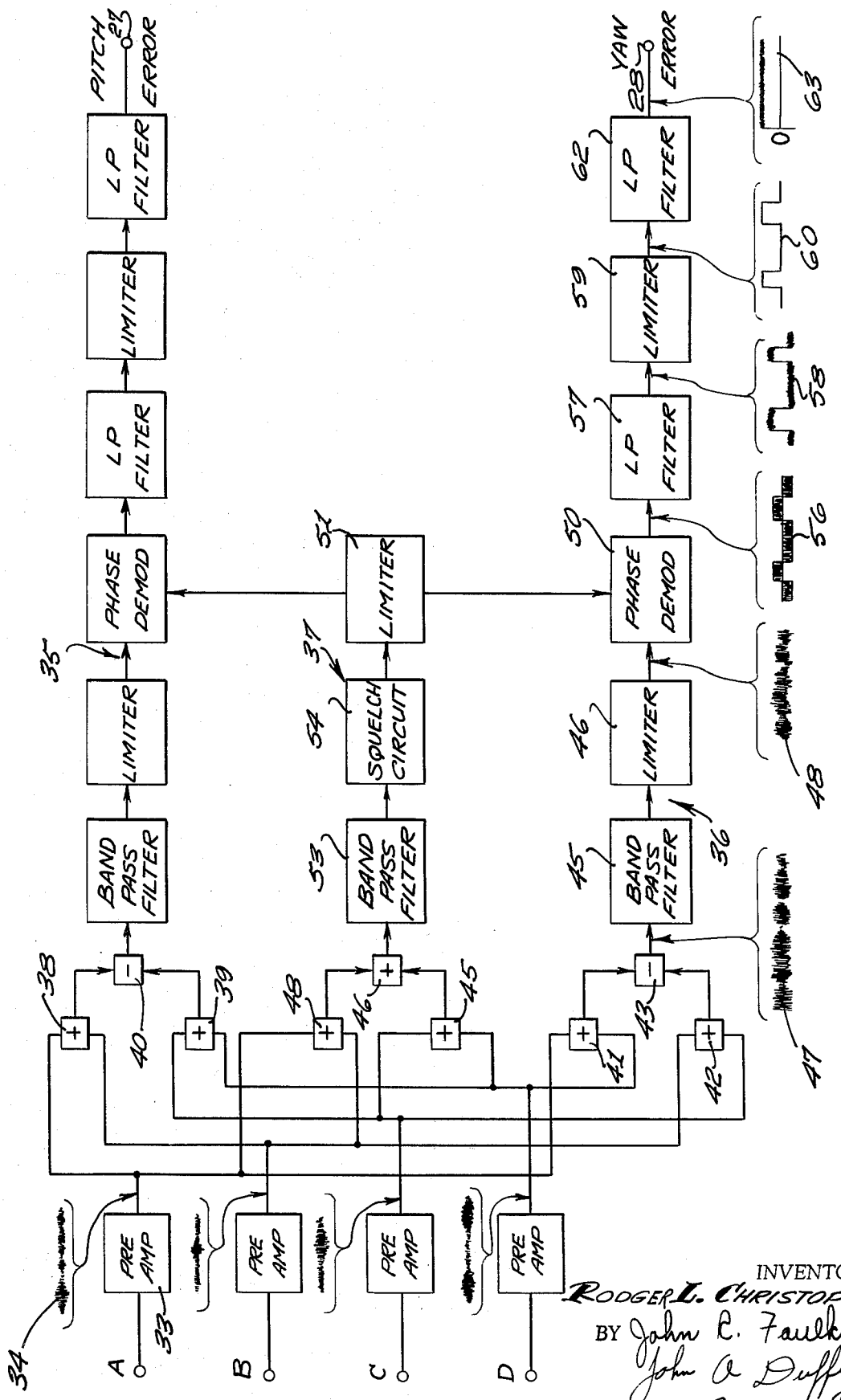

ELECTRONIC TRACKING DEVICE

This invention relates to radiant energy tracking systems and more particularly to an infrared angular tracking device with no moving parts.

In a system for tracking a target producing a radiant energy signal the intensity shimmer of the signal from the source produces an amplitude modulation of the incoming infrared signal at the tracker which is proportional to the signal strength. Efforts to reduce the intensity shimmer by increasing the strength of the source or the sensitivity of the detector meet with failure due to the fact that errors increase with the increasing strength of the source. Accordingly, it is an object of this invention to provide a radiant energy tracking device of improved accuracy and reliability.

In a copending application of J. L. Johnson and R. U. Pierotti, assigned to the assignee of the present case, entitled RADIANT ENERGY TRACKING DEVICE Ser. No. 148,092 and filed Oct. 27, 1961, an infrared tracking device is described which is sensitive to radiation of scanned targets. An optical system disposed along an optical axis corresponding to a predetermined line of sight axis receives modulated infrared signal pulses reflected from a target in space. Means are included for measuring the time duration of the pulses to provide signals proportional to the angular deviation of the target from the line of sight axis. The pulse duration modulated system of the invention substantially eliminates the effect of atmospheric shimmer.

The present invention is an improvement over the above-mentioned application by providing an infrared angular tracking device with no moving parts.

According to one aspect of the invention, an electronic tracking device is provided which is sensitive to radiation from a scanned target. An optical system is provided which is disposed along an optical axis corresponding to a predetermined line of sight axis and receives modulated infrared signal pulses reflected from a target in space. Signal pulses are produced by nutating a target image formed in the optical system by electronic means which converts the optical image to an electronic image at a focal point. The electronic image is nutated in a focal plane about the optical axis. The detector, comprising four quadrant surfaces separated and disposed in the focal plane, provides pulse signals at each of the surfaces which produces signals proportional to the horizontal and vertical deviation of the target from the optical axis.

It is therefore another object of this invention to provide an infrared tracking device with no moving parts.

It is a further object of this invention to provide an infrared tracking system in which the signal from an infrared source is time modulated to detect the angular error between the source and an established line of sight.

Other objects of the invention will become apparent from the following description read in conjunction with the accompanying drawings, in which:

FIG. 1 is a diagram in schematic and block form illustrating the principles of the invention, FIG. 2 is a view of the infrared detector of the invention showing the path of the target image on the detector surfaces when the target source is on the optical axis, FIG. 3 illustrates the wave forms of the output of the detector when the target source is on the line of sight axis of the detector as shown in FIG. 2, FIG. 4 is a view of the infrared detector of the invention showing the path of the target image on the detector surfaces when the target source is off the line of sight axis of the detector, FIG. 5 illustrates wave forms of the output of the detector when the target is off the line of sight axis as illustrated in FIG. 4, and FIG. 6 is a schematic block diagram of an electrical circuit for receiving the output of the detector.

Referring now to the drawings for a more detailed understanding of the invention, and particularly to FIG. 1, there is shown an infrared tracking system for determining the distance of a target source from a predetermined line of sight or optical axes 11. The incoming signal from a modulated target source (not shown) is focused in the optical system wherein an aperture lens 12 forms a target image 13 on a photoelectric cathode 14 of an image converter tube 15 which is disposed along the optical axis 11. The tube 15 is a conventional image converter tube in which an electronic beam emanating from the cathode 14 is projected on a collector electrode 16 at the rear of the tube 15. The collector electrode 16 which may comprise a fluorescent screen has formed thereon an electronic image of the optical image formed on the cathode 14. A pair of conventional horizontal and vertical deflection coils 17 and 18 are disposed to deflect the electron beam to rotate it in a circular pattern about the optical axis 11. An electron deflection control circuit 18 responsive to a program control 19 provides signal excitation to the deflection coils 17 and 18 of a predetermined frequency phase and amplitude so that the position of the electronic image of the target on the collector electrode 16 may be controlled to allow nutation of the image in a circle of predetermined size.

The electronic image of the target formed on the collector electrode 16 is nutated in a first focal plane coinciding with the collector electrode normal to the optical axis 11. A relay lens 22 disposed along the optical axis 11 is responsive to the electronic image in the first focal plane of the collector electrode 16 and forms an optical image 23 of the target in a second focal plane 24. A radiant energy detector 25 which may be in the form of a core has four detector surfaces indicated as A, B, C, and D disposed in the focal plane 24 to receive the optical image. The surfaces A, B, C, and D are preferably adjacent to each other to form a cross where their surfaces are joined. A summing matrix 26 responsive to the output signals from the detector surfaces A, B, C, and D provide signals at the terminals 27 and 28 indicative respectively of the vertical deviation of the target from the optical axis and the horizontal deviation from the optical axis. Thus, the terminal 27 yields a pitch error signal and the terminal 28 presents a yaw error signal.

The field of view of the image on the detector surfaces may be regulated and determined by a field stop 21 which may be an ordinary camera iris controlled by a field of view control 30 in accordance with predetermined controls from the program control 19.

The target image 23 is nutated about the detector surfaces A, B, C, and D at a predetermined rate so that it describes a circle on the surfaces. The surfaces A, B, C, and D each form a quadrant of a circle inscribed by movement of the target image. The proportion of time the target image 23 spends on each of the detectors A, B, C, and D indicates the vertical and horizontal deviation of the target from the optical axis 11. Thus, a pulse duration system is provided in which the information is indicated by the duration or width of the output pulses from the detectors A, B, C, and D.

The detector surfaces A, B, C, and D consist of a suitable radiant energy sensitive material such as indiumantimonide which has a low system noise characteristic. The sensitivity of the detectors is relatively independent of the surface area because of the extremely low noise characteristics of the detector material.

The utilization of an image converter tube 15 to electronically provide the nutation of the image point provides a detector without any moving parts. The particular type of image converter tube utilized will depend on the particular source being tracked and the collector electrode which may be a fluorescent screen may be matched to the characteristics of the detector surfaces.

Referring now to FIG. 2, a view of the detector 25, there is shown a circular path 31 upon which the target image 32 is nutated in accordance with the system described in FIG. 1. Image 32 will follow a symmetrical path such as 31 when the target source is exactly on the optical axis 11. The duration of the target image 32 on each of the quadrant detectors A, B, C, and D is equal since the center of the circle inscribed by the path 31 is on the optical axis 11. This is an indication that the target source is on the axis 11.

In FIG. 3, the wave form of the output of the detector 25 for the path 31 of FIG. 2, the wave forms A1, B1, C1, and D1, respectively, are indicative of the outputs of the detector surfaces A, B, C, and D, when the target image 32 is on the path 31 in FIG. 2. As can readily be seen in FIG. 3, the time duration or width of the output pulses from each of the detectors is equal, for a cycle beginning at zero degrees and ending at 360°. This is indicative of the fact that the target image is spending an equal time on each of the surfaces A, B, C, and D and that the target source is exactly on the optical axis 11.

Referring now to FIG. 4, there is shown a path 30 followed by the target image 32 when the target source is not on the optical axis 11. For example, as shown by the path 30, a target has substantially zero vertical deviation and a considerable horizontal deviation to the right of the optical axis 11, which is represented at the center of the circle of FIG. 4. Thus, it may be seen that in FIG. 4, the image 32 spends more time on the surfaces A and D and less time on the surfaces B and C.

In FIG. 5, an illustration of the wave forms of the output of FIG. 4, the wave forms A2, B2, C2, and D2 illustrate the outputs of the surfaces A, B, C, and D when the target image 32 is nutating about an axis 11a on the path 34. Thus, the width of the pulses B2, and C2 are smaller than the pulses A2 and D2. In other words, the time duration of the image 32 is less on the surfaces B and C than it is on A and D. An analysis of the output signals produced by the wave forms of FIG. 5 by the summing matrix 26 of the system in FIG. 1 will produce output error signals indicative of the amount and duration of deviation of the target source on the axis 11a from the optical axis 11.

Referring now to FIG. 6, a schematic block diagram of the electrical circuit of the summing matrix 26, there is shown the terminals A, B, C, and D corresponding to the terminals in FIG. 1 at the input of the summing matrix 26 from the respective detector surfaces A, B, C, and D. The signals at each of the terminals A, B, C, and D are fed to preamplifiers such as an amplifier 33 which amplify the incoming modulated signals to produce a signal such as shown by the wave form enclosed in 34. The outputs of the pre-amplifiers are fed to a summing network in which the signals are combined to provide output signals to a pitch error channel circuit 35, a yaw error channel circuit 36, and a reference channel circuit 37. The pitch error channel 35 having summing means 38 and 39 and subtracting means 40 combines the outputs of the pre-amplifiers in the relation $(A+B)-(C+D)$ to provide a signal at the output of difference means 40 indicative of the direction and amount of vertical deviation of the target source from the optical axis.

The yaw error channel circuit 36 is provided with summing means 41 and 42 and subtracting means 43 which combine the outputs from the pre-amplifiers in the relation $(A+D)-(B+C)$ to present a signal at the output of the subtracting means 43 as shown, for example, by the wave form 47 which is proportional to the horizontal deviation of the target from the optical axis.

The reference channel 37 having summing means 48, 45, and 46 to produce at the output of summing means 46, a reference signal which is a summation of all the outputs $A+B+C+D$. This reference signal is a phase reference signal used to maintain synchronism between the signals in the pitch channel 35 and the yaw channel 36.

In the yaw channel 36 the output signal from subtracting means 43 is presented to a band pass filter 45 which compensates for the effects of phase shift due to any change in the modulation rate of the target source or any drift caused by changes in the characteristics of the components of the optical system. The output of the band pass filter 45 is then fed to a limiter 46 which eliminates high-amplitude noise signals. This can be accomplished in the system of the invention because the width of the incoming signal is measured and not the amplitude. The amplitude limited signal at the output of the limiter 46, shown for example, by the wave form enclosed in 48, is fed to a phase demodulator 50 which synchronously demodulates the signal from the limiter 46 in accordance with a reference signal provided by a limiter 51 in the reference channel 37. A phase reference signal is developed in the channel 37 wherein the output of the summing means 46 is fed through a band pass filter 53 and a squelch circuit 54 to the limiter 51. One output of the limiter 51 is fed to the phase demodulator 50 to provide a phase reference signal.

The output of the demodulator 50, shown for example, by the wave form enclosed by 56, is filtered by a low pass filter 57 which provides an output, shown for example, by the wave form enclosed by 58, which is a unidirectional signal indicative of the horizontal deviation of the target from the optical axis 11. The output of the filter 57 is fed to a limiter 59 which provides a signal at its output, shown for example, by the wave form enclosed by 61, which, when filtered by a low pass filter 62 provides an output signal at terminal 28 which, as is shown for example, by the wave form enclosed by 63, is a direct current signal which is proportional to the time duration of the outputs of the detector surfaces A, B, C, and D. Thus, as shown for example, by the wave form enclosed by 62, a substantial horizontal deviation error signal is produced.

The pitch error channel circuit 35 operates in a like manner as described for the yaw channel 36 receiving an output signal from the subtracting means 40 and providing through electronic circuitry corresponding to the circuitry in the yaw channel 36 an output signal at the terminal 27 indicative of the vertical deviation of the target source from the optical axis 11.

In addition to the advantages of the pulse duration modulation system of the invention as enumerated in the copending application hereinbefore referred to of the ability to eliminate noise in the electronic processing circuitry without affecting accuracy and reliability, the nonmechanical means of nutating the image of the source over the surfaces of the quadrant detectors to gain positional information of the target source offers extreme advantages and reliability and simplicity over the copending application which utilizes mechanical scanning means.

As described in this specification, a radiant energy tracking system utilizing electronic means for nutating the image of a source over the face of quadrant detectors has been provided to track an infrared source such as may occur, wherein it is desired to guide a missile with an infrared source from a ground tracking unit. It is to be realized that the infrared tracker of the device may readily be utilized in other systems for tracking any radiant energy source.

Although as described in this system, it is assumed that the infrared source is modulated by means located at the target before it is presented to the optical system as shown in FIG. 1, it is readily apparent to one skilled in the art that if it is desired to track a source such as an enemy missile, means can easily be provided in the system of FIG. 1 for modulating the incoming source.

Although the invention has been described and illustrated in detail, it is to be clearly understood that the same is by way of illustration and example only and is not taken by way of limitation, the spirit and scope of this invention being limited only by the terms of the appended claims.

I claim:

1. In an electronic tracking device sensitive to radiation of scanned targets the combination of:
   focusing means having an optical axis for forming an optical image of a target,
   means for converting said optical image to an electronic image at a focal point,
   means for nutating said electronic image in a focal plane about said optical axis,
   detector means comprising a plurality of separated detector surfaces,
   means responsive to said nutated electronic image for forming a target image on said detector surfaces,
   and means for measuring the proportional duration of said target image on each of said surfaces to provide signal proportional to the deviation of said target from said optical axis.

2. The combination recited in claim 1 wherein said detector means comprises four quadrant surfaces.

3. The combination recited in claim 1 wherein said means for forming a target image on said detector surfaces comprises:
   an optical lens disposed along said optical axis and responsive to said electronic image for forming a target image on said detector surfaces, and
   a field stop disposed along said optical axis for varying the field of view of said image.

4. In a radiant energy tracking device sensitive to radiation of scanned targets, the combination of:
   optical focusing means having an optical axis for receiving modulated signal pulses reflected from a target and forming an optical image of said target,
   means for converting said optical image to an electronic image at a focal point,
   means for nutating said electronic image in a first focal plane about said optical axis,
   means responsive to the electronic image in said first focal plane for forming a nutated optical image in a second focal plane about said optical axis,
   detector means comprising four surfaces, each surface occupying a quadrant in the circle encompassed by said image as it nutates in the second focal plane about said optical axis,
   said detector means providing an output signal from each of said surfaces indicative of the duration of said target image on its respective surface, and
   summing means responsive to said output signals for providing signals proportional to the deviation of said target from said optical axis.

5. The combination recited in claim 4 wherein said means for forming a nutated optical image in a second focal plane comprises:
   an optical lens disposed along said optical axis and responsive to said electronic image for forming a target image in said second focal plane, and
   a field stop disposed along said optical axis for varying the size of said electronic image.

6. In a radiant energy tracking device sensitive to radiation of scanned targets the combination of:
   an aperture lens having an optical axis for receiving modulated signal pulses reflecting from a target and forming an optical image of said target,
   an image converter tube disposed along said optical axis and having a photo-electric cathode on which said optical image is formed, and a collector electrode on which an electronic image is formed from said optical image,
   said image converter tube having electron deflection control means for deflecting the electron beam issued from said cathode in a circular pattern whereby said electronic image is nutated in a first focal plane at said collector electrode about said optical axis,
   a relay lens disposed along said optical axis and responsive to said electronic image in said first focal plane for forming an optical image of said target in a second focal plane,
   a detector having four quadrant surfaces in said second focal plane, said surfaces being encompassed by said image at it nutates, and
   a summing matrix responsive to the outputs of said surfaces for providing signals indicative of the horizontal and vertical deviations of the target from said optical axis.

7. The combination recited in claim 6 further including a field stop disposed along said optical axis between said first and second focal planes for varying the field of view of said optical system.

* * * * *